(12) United States Patent
Horton

(10) Patent No.: US 10,122,853 B2
(45) Date of Patent: Nov. 6, 2018

(54) INTELLIGENT TIME SLOT RECOMMENDATION FOR INTERACTIVE VOICE RESPONSE (IVR) SYSTEMS

(71) Applicant: TimeTrade Systems, Inc., Tewksbury, MA (US)

(72) Inventor: Tyler Horton, Tewksbury, MA (US)

(73) Assignee: TimeTrade Systems, Inc., Tewksbury, MA (US)

( * ) Notice: Subject to any disclaimer, the term of this patent is extended or adjusted under 35 U.S.C. 154(b) by 0 days.

(21) Appl. No.: 15/086,708

(22) Filed: Mar. 31, 2016

(65) Prior Publication Data

US 2016/0295015 A1    Oct. 6, 2016

Related U.S. Application Data

(60) Provisional application No. 62/143,291, filed on Apr. 6, 2015.

(51) Int. Cl.
| | | |
|---|---|---|
| *H04M 11/00* | (2006.01) | |
| *H04M 3/493* | (2006.01) | |
| *G06Q 10/10* | (2012.01) | |
| *G06F 17/30* | (2006.01) | |

(Continued)

(52) U.S. Cl.
CPC .......... *H04M 3/493* (2013.01); *G06F 3/0482* (2013.01); *G06F 17/3053* (2013.01); *G06Q 10/1095* (2013.01); *H04M 3/4217* (2013.01)

(58) Field of Classification Search
CPC ......... H04M 3/493; H04W 8/18; H04W 4/16; H04W 48/04; H04W 4/02; H04W 4/027; H04W 4/046; H04W 52/0251; H04W 64/006; H04W 68/00; H04W 4/12
USPC .... 379/196, 220.01, 265.01, 265.02, 265.09, 379/266.01, 88.13, 142.07, 201.01, 201.1, 379/221.02, 221.06, 221.07, 265.11, 379/265.12, 265.13, 52, 88.01, 88.14, 379/88.18, 88.22, 88.23, 93.23, 93.24
See application file for complete search history.

(56) References Cited

U.S. PATENT DOCUMENTS

| | | | | |
|---|---|---|---|---|
| 6,496,567 | B1 * | 12/2002 | Bjornberg ............. | H04M 3/493 379/142.07 |
| 7,200,210 | B2 * | 4/2007 | Tang .................... | G06Q 10/109 379/210.01 |

(Continued)

*Primary Examiner* — Akelaw Teshale
(74) *Attorney, Agent, or Firm* — Edell, Shapiro & Finnan, LLC

(57) ABSTRACT

A call may be received from a caller at an interactive voice response server with information indicating a caller preferred choice including a date and a time for an appointment. The caller preferred choice for the appointment may be determined as not available. A set of heuristic evaluations may be used to evaluate each of a plurality of available time slots individually to generate a plurality of intermediate results for each available time slot. Each intermediate result may have a weight associated with a corresponding heuristic evaluation. For each available time slot, the plurality of intermediate results may be aggregated using multiplicative weightings based on respective weights to produce aggregated results. A ranked list of candidate time slots to be used for the appointment may be generated based on the aggregated results and the caller may be prompted for a selection from the ranked list of candidate time slots.

17 Claims, 4 Drawing Sheets

(51) Int. Cl.
*G06F 3/0482* (2013.01)
*H04M 3/42* (2006.01)

(56) References Cited

U.S. PATENT DOCUMENTS

| | | | |
|---|---|---|---|
| 8,190,804 B1* | 5/2012 | Srinivasan | G06F 13/1615 710/240 |
| 2004/0001575 A1* | 1/2004 | Tang | G06Q 10/109 379/88.04 |
| 2009/0171752 A1* | 7/2009 | Galvin | G06Q 10/06 705/7.11 |
| 2009/0285380 A1* | 11/2009 | Chen | H04M 3/5231 379/210.01 |
| 2012/0263120 A1* | 10/2012 | Gopalakrishnan | H04W 72/1226 370/329 |
| 2015/0281440 A1* | 10/2015 | Kelly | H04M 3/493 379/88.01 |
| 2016/0065739 A1* | 3/2016 | Brimshan | H04M 3/5231 379/88.01 |

* cited by examiner

INTELLIGENT TIME SLOT RECOMMENDATION FOR INTERACTIVE VOICE RESPONSE (IVR) SYSTEMS

PRIORITY CLAIM

This application claims priority to U.S. Provisional Patent Application No. 62/143,291, filed Apr. 6, 2015, entitled "Intelligent Time Slot Recommendation for Interactive Voice Response (IVR) Systems," the entirety of which is incorporated herein by reference.

TECHNICAL FIELD

The present disclosure relates generally to efficient workflow completion in voice-based interfaces, principally addressing the challenges of specifying time slots.

BACKGROUND

Interactive Voice Response (IVR) systems automate phone-based workflows by prompting callers to provide a combination of voice and keypad commands, IVR can expedite many tasks, but callers may become impatient if forced to listen to and select from a large list of potential options. This issue is typically addressed with hierarchical voice prompts that narrow the options through a limited number of targeted questions. However, this solution is insufficient when presenting availability options (time slots) for fixture appointments. Applying the standard technique, a caller might first be required to choose a day and then choose a time only to discover that their preferred choice is unavailable. With no other mechanism providing guidance, the caller must blindly repeat the process until a suitable time (and day) is discovered.

SUMMARY OF INVENTION

Figure 1:
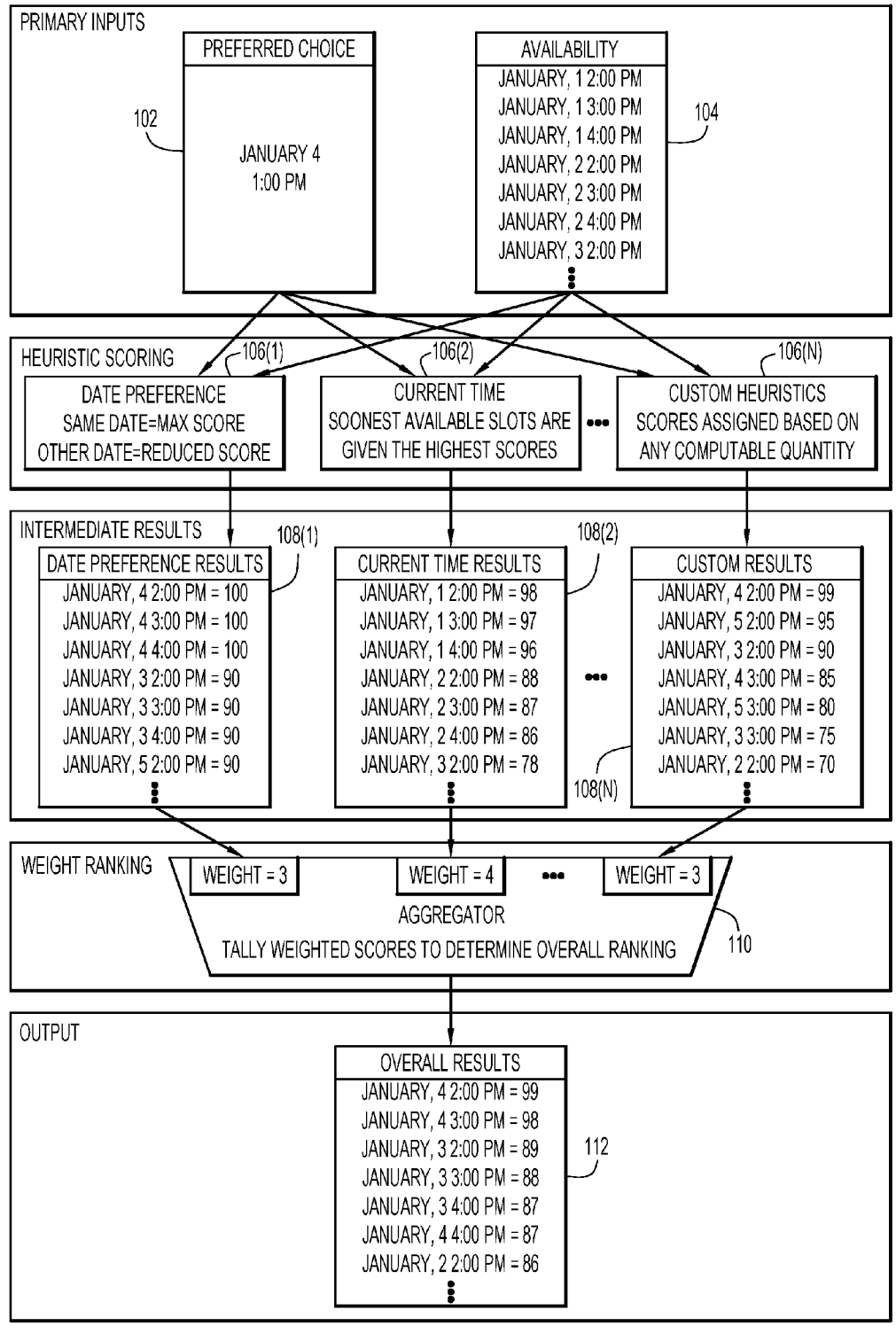
FIG. 1 is a system overview flow diagram showing inputs, processing, intermediate results and outputs according to an example embodiment.

Presented herein is a system and method capable of reducing how long it takes a caller to select an appointment time slot through an IVR. system. This is accomplished through a combination of heuristic and machine learning techniques that increase the prominence of options that the caller is more likely to select, Specifically, an exemplary system and method may compute an ordered ranking over the availability options based partly on factors such as:
1) The caller's currently preferred appointment date
2) The caller's currently preferred appointment time of day
3) The caller's currently preferred appointment day of week
4) The caller's historically preferred appointment dates/times/days of week
5) The caller's historically selected appointment dates/times/days of week
6) Other caller's preferred or selected dates/times/days of week
7) Current date/time/day of week
8) Other refinements or criteria specifically established in the current IVR session
9) Customizations or configurations intended to effect the IVR system's behavior
10) Any other quantity calculable by the IVR system
11) Any other data retrievable from an accessible external system The IVR system could then prompt the caller to choose from a reduced list containing only the options having a high enough rank. Optionally, the IVR system may convey the rationale supporting its recommendations, allowing the caller to further refine their search criteria. An IVR system using such techniques may allow the caller to more efficiently select a time slot when scheduling a future appointment.

DESCRIPTION OF EXAMPLE EMBODIMENTS

Overview

Techniques are provided for generating interactive voice responses. According to one embodiment, at an interactive voice response server, a call may be received from a caller. Caller information indicating a caller preferred choice for an appointment may also be received, The caller preferred choice may include a date and a time for the appointment. The caller preferred choice for the appointment may be determined as not available. A set of heuristic evaluations may be used to evaluate each of a plurality of available time slots individually to generate a plurality of intermediate results for each of the plurality of available time slots to be used for the appointment. Each intermediate result may have a weight associated with a corresponding heuristic evaluation. For each of the plurality of available time slots, the plurality of intermediate results may be aggregated using multiplicative weightings based on respective weights associated with corresponding heuristic evaluations to produce aggregated results. A ranked list of candidate time slots to be used for the appointment may be generated based on the aggregated results and the caller may be prompted for a selection from the ranked list of candidate time slots.

Example Embodiments

Reference is made first to FIG. 1, in which a system overview flow diagram shows inputs, processing, intermediate results, weight ranking and outputs for an IVR system according to an example embodiment. The IVR system may prompt a caller to select a future appointment time slot based on inputs and generate a ranked list of candidate available time slots. As shown in FIG. 1, the overall process to generate the ranked list of candidate available time slots may start with receiving primary inputs, which may include a preferred choice 122 and a list of available time slots 104. The IVR system may collect the caller's preferred choice 102 either through voice or keypad input, and retrieve the set of available time slots 104 from an associated dynamic availability system. If the preferred choice is available, the IVR system may simply, return it. Otherwise, the IVR system may perform a set of heuristic evaluations 106(1), 106(2) through 106(n) (n being an integer larger than 2) to score the available time slots. The intermediate results 108(1), 108(2)-108(n) may be weighted (positively or negatively) and combined using an aggregator 110 to arrive at an overall ranking 112.

In one embodiment, the intermediate results 108(1)-108(n) may be heuristic scores with values ranging from 0 to 100 assigned to individual time slots by modules that each accept two primary inputs—the caller's preferred choice 102 and availability data 104. Each module may also rely upon any other retrievable data or computable quantity when assigning a time slot's score. FIG. 1 shows exemplary heuristic scoring based on date preference 106(1), current time 106(2) and custom heuristics 106(n).

Date Preference 106(1)—This scores time slots according to the caller's preferred appointment date. A maximum score (100) is given to any time slot sharing the chosen date. A reduced score is assigned to each other time slot in proportion to the span separating its date from the chosen date. For example, time slots from the prior day may receive a slightly reduced score (90) whereas two days prior would be even further reduced (70), regardless of time preference.

Current Time 106(2)—This scores time slots in proportion to the span separating them from the current moment in time. This supports the notion that caller's are interested in booking the soonest available appointment.

Custom Heuristics 106(n)—This scores time slots according to an algorithm that uses any computable quantity or retrievable data. An algorithm supporting such a heuristic scoring module may be defined via an evaluable expression in a general-purpose programming language. For example, a scoring module intending to "Give time slots neighboring already scheduled appointments higher scores" may be expressed this way.

In addition to these three scoring examples shown in FIG. 1, there are numerous other conditions that may be used for heuristic scoring. The following list gives examples of other possible heuristic scoring modules that the IVR system may incorporate:

Time of Day Preference—scores time slots according to the caller's preferred time of day for an appointment. A maximum score (100) is given to any time slot sharing the chosen time of day. A reduced score is assigned to each other time slot in proportion to the span separating its time from the chosen time. For example, time slots from the prior hour may receive a slightly reduced score (90) whereas two hours prior would be even further reduced (70), regardless of date preference.

Day of Week Preference—scores time slots according to the caller's preferred day of week for an appointment. A maximum score (100) is given to any slot sharing the chosen day of week. A reduced score is assigned to each other time slot in proportion to the span separating its day from the chosen day. For example, if the preferred day of week were Friday, any time slots on a Saturday would receive a slightly reduced score (80) whereas Monday time slots would be even further reduced (40), independent of date or time preferences as described above.

Historical Preferences—scores time slots according to the current caller's past initial system input (preferred choice). Options that are deemed more similar to the caller's previous preferences (based on date, time, day of week, or other factors) are scored high than those that are not. For example, if a caller had previously requested 3 pm, then nonconforming time slots would receive reduced scores.

Historical Selections—scores time slots according to the current caller's past booking history. Options that are deemed more similar to the caller's previous selections (based on date, time, day of week, or other factors) are scored high than those that are not. For example, if a caller had previously scheduled only afternoon appointments, then time slots during morning hours will receive reduced scores.

Popular Preferences—scores time slots according to statics combining all callers' past initial system input (preferred choices). Options that are deemed more similar to popular preferences (based on aggregated dates, times, days of week, or other factors) are scored high than those that are not. For example, if most callers request weekend appointments, then weekday time slots would receive a reduced score.

Popular Selections—scores time slots according to statics combining all callers' past booking history. Options that are deemed more similar to popular selections (based on aggregated dates, times, days of week, or other factors) are scored high than those that are not. For example, if most callers select weekend appointments, then weekday time slots would receive a reduced score.

Current Date—scores time slots in the same manner as Date Preference 106(1) if the caller were to specify the current moment in time as their preferred choice.

Current Time of Day—scores time slots in the same manner as Time of Day Preference if the caller were to specify the current moment in time as their preferred choice.

Current Day of Week—scores time slots in the same manner as Day of Week Preference if the caller were to specify the current moment in time as their preferred choice.

This above list is not intended to be exhaustive. Other modules may be developed and used interchangeably so long as the reliance on the primary inputs (preferred choice and availability inputs producing scored time slot outputs) is maintained. In some embodiments, each module may be implemented as a process or a sub-process in hardware, software or combination thereof. Moreover, multiple modules may be combined using techniques known or to be developed in the art.

Once all participating modules assign heuristic scores, the IVR. system may aggregate these intermediate results 108(1), 108(2) through 108(n) via multiplicative weightings using the aggregator 110. That is the aggregator 110 may compute a time slot's overall score by summing all products of module's score with its assigned weight and renormalizing. Assuming there are n distinct modules, this quantity is given formally as:

$$\frac{\sum_{i=1}^{n} Score_i * Weight_i}{\sum_{i=1}^{n} Score_{MAX} * Weight_i}$$

After the overall score is computed for each available time slot, the system delivers the ranked list of options to the IVR system, which will then continue to prompt the caller for their selection, Heuristic scoring module weights may be initially configured according to the needs of the associated IVR system and workflow that the IVR system serves. In some embodiments, one or more processes may be implemented to change the initial weight associated with a heuristic scoring module while the system operates. One exemplary process may temporarily. change weights for subsequent iterations within a single IVR session. This may allow criteria specified by the caller (e.g. indicating that only a given date, time of day, or day of week will suffice) to further refine the options presented in the remainder of a workflow. Another exemplary process of altering module weights may employ machine learning techniques to increase the weight of any module that computed a high score for the time slot eventually selected by the caller. Similarly, weights are reduced for modules that fail to predict the caller's selection. The weights updated by machine learning may be persisted across multiple invocations of the IVR system, supporting the notion that the IVR system may automatically tune weights to achieve optimal results over time.

Sample Interactions

Some transcripts are provided below that demonstrate how the system's output might be used by within an IVR call. Each transcript begins at the point where the system attempts to collect the caller's preferred appointment time.
IVR: "When would you like to schedule your massage?"
Caller: "Friday at 6 pm"
IVR: "Unfortunately that time is unavailable. Would Friday at 7 pm work instead?"
Caller: "Yes"
IVR: "Great. Your massage is confirmed for Friday, May 2 at 7 pm."
IVR: "When would you like to schedule your massage?"
Caller: "Friday at 6 pm"
IVR: "Unfortunately that time is unavailable. Would Friday at 7 pm work instead?"
Caller: "No"
IVR: "OK. Here are some other choices. Press 1 for Friday at 5 pm, press 2 for Saturday at 1 pm, press 3 for Saturday at 6 pm, or press 4 for more options.
Caller: <3>
IVR: "Thanks, Your massage is confirmed for Saturday, May 3 at 6 pm."
IVR: "When would you like to schedule your massage?"
Caller: "Friday at 6 pm"
IVR: "Unfortunately that time is unavailable. Would Friday at 7 pm work instead?"
Caller: "No"
IVR: "OK. Here are some other choices. Press 1 for Friday at 5 pm, press 2 for Saturday at 1 pm, press 3 for Saturday at 6 pm, or press 4 for more options."
IVR: "OK. Press 1 to hear more choices on Friday, press 2 to hear weekend choices, press 3 to hear other dates when an appointment is available at 6 pm, or press 4 for more options."
Caller: <3>
IVR: "Press 1 for 6 pm on Monday, press 2 for 6 pm on Tuesday, press 3 for 6 pm on Thursday, or press 4 for more options."
Caller: <1>
IVR: "Alright, Your massage is confirmed for Monday, May 5 at 6 pm."
IVR: "Using your telephone keypad, enter your preferred booking date."
Caller: <0><5><0><7>
IVR: "May 7. Now please enter your preferred time."
Caller: <1 ><5><3><0>
IVR: "3:30 pm on May 7 is not available but there are some similar times. Press 1 for May 7 at 3 pm, press 2 for May 7 at 4 pm, press <3> for May 8 at 3:30 pm, or press 4 for more options."
Caller: <2>
IVR: "Your appointment is confirmed at 4 pm on May 7. Thanks for calling!"

Figure 2:
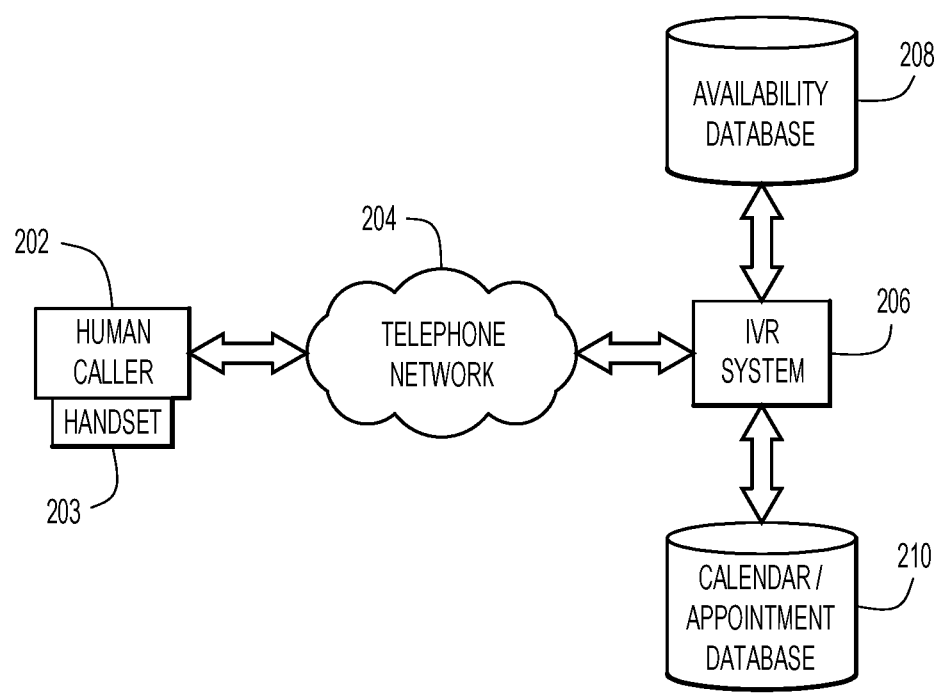
FIG. 2 is a block diagram illustrating relevant components for the system shown in FIG. 1 according to an example embodiment.

FIG. 2 shows a system block. diagram of the entities involved in the process depicted in FIG. 1. As shown in FIG. 2, in the system 200, a human caller 202 may make a phone call from a handset (wireless or wired) 203 via a telephone network 204, An IVR system 206 may receive the cab via the network 204. The IVR system 206 may be communicatively connected to an availability database 208 and a calendar/appointment database 210. The telephone network 204 may be wired, wireless, traditional, Internet Protocol (IP) based, or any combination thereof. Accordingly, the IVR system 206 may comprise a telephone interface that is configured to receive phone calls via such a telephone network. In one embodiment, either or both availability database 208 and calendar appointment database 210 may be implemented as part of the IVR system 206.

Figure 3:
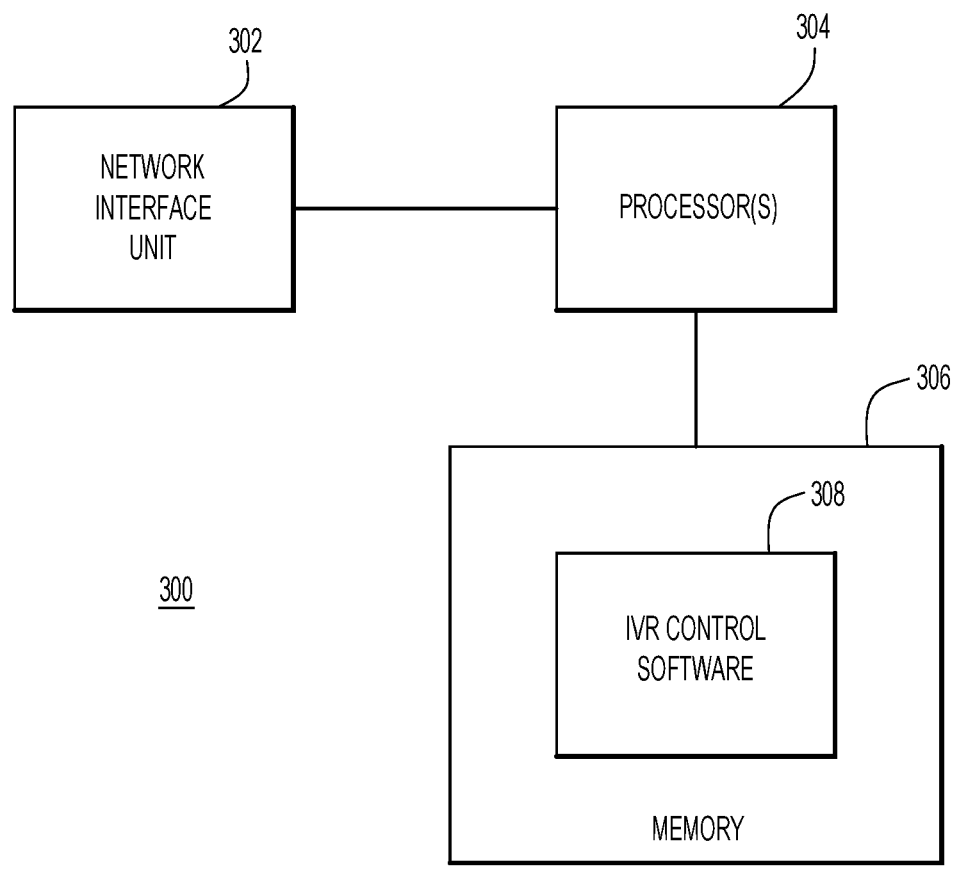
FIG. 3 is a block diagram of IVR system components configured to perform the operations depicted in FIG. 1 according to an example embodiment.

With reference to FIG. 3, there is an illustration of an example architecture of a computing apparatus 300 to implement the IVR system according to an embodiment. The apparatus 300 may comprise a network interface 302 to interfke the entities shown in FIG. 2, one or more processors 304 and a memory 306. Resident in the memory 306 is IVR Control Software 308. The IVR Control Software 308 may include instructions that, when executed by the one or more processors, causes the IVR system to perform the operations described and shown herein, which may include operational processes for generating candidate available time slots as described above, and is further described in connection with FIG. 4.

Figure 4:
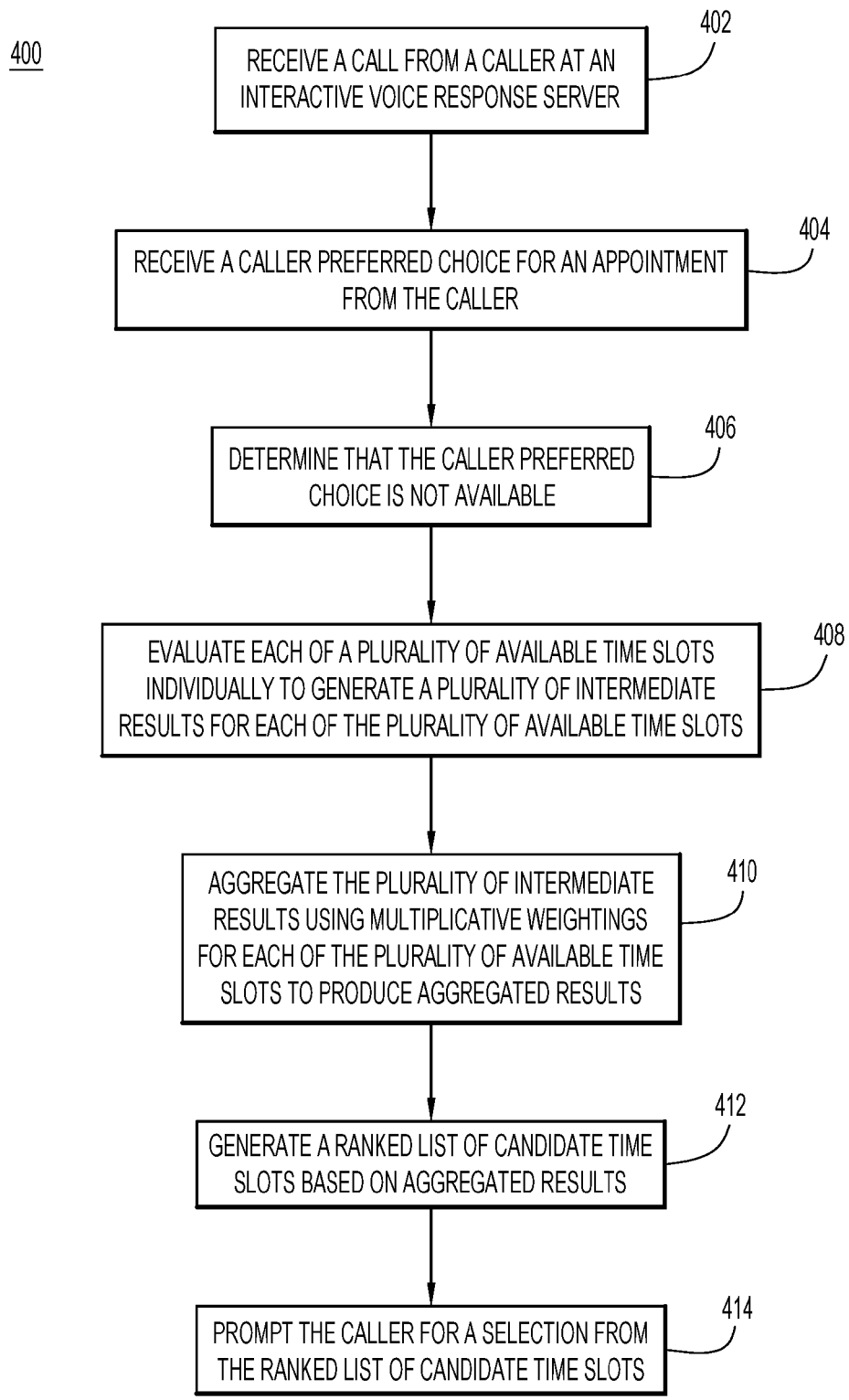
FIG. 4 is a flow chart illustrating, at a high-level, operations performed to generate interactive voice responses according to an example embodiment.

The processor 304 is, for example, a microprocessor, a microcontroller, systems on a chip (SOCs), or other fixed or programmable logic. The memory 306 may include read only memory (ROM), random access memory (RAM), magnetic disk storage media devices, optical storage media devices, flash memory devices, electrical, optical, or other physical/tangible memory storage devices. The memory 306 may be separate or part of the processor 304. Thus, in general, the memory 306 may comprise one or more tangible (e.g., non-transitory) computer readable storage media (e.g., a memory device) encoded with software comprising computer executable instructions and when the software is executed (by the processor 304) it is operable to perform the operations described herein in connection with the IVR system. To this end, the memory 306 may store software instructions that, when executed by the processor 304, cause the processor 304 to perform a variety of operations to generate interactive voice responses described herein. For example, the memory 306 may store instructions for the processor 304 to perform the operations described herein in connection with FIGS. 1-2 above and the process 400 as shown in FIG. 4 and described below. Process 400 may also be implemented in hardware using hardware logic, or be implemented in a combination of both hardware and software.

The functions of the processor 304 may be implemented by a processor or computer readable tangible non-transitory medium encoded with instructions or by logic encoded in one or more circuits (e.g., embedded logic such as an application specific integrated circuit (ASIC), digital signal processor (DSP) instructions, software that is executed by a processor, etc.), Wherein the memory 306 stores data used for the computations or functions described herein (and/or to store software or processor instructions that are executed to carry out the computations or functions described herein). Thus, functions of the process 400 may be implemented with fixed logic or programmable logic (e.g., software or computer instructions executed by a processor or field progammable gate array (FPGA)).

It should be appreciated that in other embodiments, the apparatus 300 may include fewer or more modules apart from those shown in FIG. 3. In another example, the process 400 may be in the form of firmware that is processed by Application Specific Integrated Circuits (ASICs), which may be integrated into a circuit board. Alternatively, the process 400 may be in the form of one or more logic blocks included in a programmable logic device (e.g., a field-programmable gate array). Moreover, the apparatus 300 may be adapted, and/or additional structures may be provided, to provide alternative or additional functionalities beyond those specifically discussed in reference to FIG. 3. Modifications or additions to the structures described in relation to FIG. 3 to implement these alternative or additional functionalities are envisioned without departing from the scope and spirit of the embodiments presented herein.

Referring to FIG. 4, an example flowchart is shown that generally depicts the operations of an IVR system to generate interactive voce responses, according to the techniques described herein. At 402, at an interactive voice response server, a call may be received from a caller. At 404, a caller preferred choice for an appointment may be received. The caller preferred choice may include a date and a time for the appointment. At 406, it may be determined that the caller preferred choice for the appointment is not available. At 408, each of a plurality of available time slots may be evaluated individually to generate a plurality of intermediate results for each of the plurality of available time slots. As described herein, in one embodiment, a set of heuristic evaluations may be used. Each intermediate result may have a weight associated with a corresponding heuristic evaluation. At 410, the plurality of intermediate results may be aggregated using multiplicative weightings for each of the plurality of available time slots, based on respective weights associated with corresponding heuristic evaluations to produce aggregated results. At 412, a ranked list of candidate time slots to be used for the appointment may be generated based on the aggregated results and at 414 the caller may be prompted for a selection from the ranked list of candidate time slots.

The techniques provided herein may provide a way for generating candidate available time slots for an appointment. In the embodiments described herein, available time slots are evaluated based on a caller's preferred choice using a set of heuristic evaluations preference. The heuristic results are weighted and combined to generate a ranked candidate list. The system using such techniques may allow the caller to more efficiently select a time slot when scheduling a future appointment.

The operational workflow depicted in FIGS. 1 and 4 may be performed by one of several functional modules of the IVR system 206 shown in FIG. 2. Other information may be collected and other actions may be taken by the IVR system 206 befbre control is handed over to the functional module of the IVR system 206 that performs the operational workflow of FIGS. 1 and 4. The functional module may then release control to other functional modules of the IVR system 206.

In summary, in one form, a method is provided comprising: receiving, at an interactive voice response server, receiving a call from a caller; receiving from the caller information indicating a caller preferred choice for an appointment, the caller preferred choice including a date and a time for the appointment; determining that the caller preferred choice for the appointment is not available; evaluating, using a set of heuristic evaluations, each of a plurality of available time slots individually to generate a plurality of intermediate results for each of the plurality of available time slots to be used for the appointment, each intermediate result having a weight associated with a corresponding heuristic evaluation; for each of the plurality of available time slots, aggregating the plurality of intermediate results using multiplicative weightings based on respective weights associated with corresponding heuristic evaluations to produce aggregated results; generating a ranked list of candidate time slots to be used for the appointment based on the aggregated results; and prompting the caller for a selection from the ranked list of candidate time slots.

In summary, in another form, a system may be configured to provide an interactive voice response, the system comprising: a telephone interface configured to receive a call from a caller; one or more processors configured to execute computer program instructions to: receive from the caller a caller preferred choice for an appointment, the caller preferred choice including a date and a time for the appointment; determine that the caller preferred choice for the appointment is not available; evaluate, using a set of heuristic evaluations, each of a plurality of available time slots individually to generate a plurality of intermediate results for each of the plurality of available time slots to be used for the appointment, each intermediate result having a weight associated with a corresponding heuristic evaluation; for each of the plurality of available time slots, aggregate the plurality of intermediate results using multiplicative weightings based on respective weights associated with corresponding heuristic evaluations to produce aggregated results; generate a ranked list of candidate time slots for the appointment based on the aggregated results; and prompt the caller for a selection from the ranked list of candidate time slots.

In summary, in yet another form, a non-transitory computer readable storage media is provided that is encoded with software comprising computer executable instructions and when the software is executed operable to: receive a call from a caller at an interactive voice response server; receive from the caller information indicating a caller preferred choice for an appointment, the caller preferred choice including a date and a time for the appointment; determine that the caller preferred choice for the appointment is not available; evaluate, using a set of heuristic evaluations, each of a plurality of available time slots individually to generate a plurality of intermediate results for each of the plurality of available time slots to be used for the appointment, each intermediate result having a weight associated with a corresponding heuristic evaluation; for each of the plurality of available time slots, aggregate the plurality of intermediate results using multiplicative weightings based on respective weights associated with corresponding heuristic evaluations to produce aggregated results; generate a ranked list of candidate time slots to be used for the appointment based on the aggregated results; and prompt the caller for a selection from the ranked list of candidate time slots.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A computer-implemented method for providing an interactive voice response service, the method comprising:
    at an interactive voice response server, receiving a call from a caller;
    receiving from the caller information indicating a caller preferred choice for an appointment, the caller preferred choice including a date and a time for the appointment;
    determining that the caller preferred choice for the appointment is not available;
    evaluating, using a set of heuristic evaluations, each of a plurality of available time slots individually to generate a plurality of intermediate results for each of the plurality of available time slots to be used for the appointment, each intermediate result having a weight associated with a corresponding heuristic evaluation, wherein at least one of the weights associated with a corresponding heuristic evaluation is an assigned initial weight that is adjustable based on information received from the caller;
    for each of the plurality of available time slots, aggregating the plurality of intermediate results using multiplicative weightings based on respective weights associated with the corresponding heuristic evaluations to produce aggregated results;
    generating a ranked list of candidate time slots to be used for the appointment based on the aggregated results; and
    prompting the caller for a selection from the ranked list of candidate time slots.

2. The method of claim 1, wherein the set of heuristic evaluations is based on one or more of: date preference, time of day preference, day of week preference, current time, current date, current time of day, and current day of week, and each such heuristic evaluation results in a higher score for a time and/or date closer to the date and time of the caller preferred choice.

3. The method of claim 1, wherein the set of heuristic evaluations is based on one or more of: historical preferences, historical selections, popular preferences, popular selections, and each such heuristic evaluation results in a higher score for a time and/or date closer to the historical preferences or historical selections and/or closer to the popular preferences or popular selections.

4. The method of claim 1, wherein the set of heuristic evaluations is based on at least one customer heuristic defined in an evaluable expression for a computable quantity or retrievable data using a general-purpose programming language.

5. The method of claim 1, further comprising adjusting a value of the assigned initial weight based on the information received from the caller.

6. The method of claim 1, further comprising adjusting a value of the assigned initial weight based on machine learning that includes increasing the value of the assigned initial weight if a selected heuristic evaluation generates a high score for the selection from the ranked list of candidate time slots and decreasing the value of the assigned initial weight if the selected heuristic evaluation fails to predict the selection from the ranked list of candidate time slots.

7. A system configured to provide an interactive voice response, the system comprising:
    a telephone interface configured to receive a call from a caller; and
    one or more processors configured to execute computer program instructions to:
    receive from the caller a caller preferred choice for an appointment, the caller preferred choice including a date and a time for the appointment;
    determine that the caller preferred choice for the appointment is not available;
    evaluate, using a set of heuristic evaluations, each of a plurality of available time slots individually to generate a plurality of intermediate results for each of the plurality of available time slots to be used for the appointment, each intermediate result having a weight associated with a corresponding heuristic evaluation, wherein at least one of the weights associated with a corresponding heuristic evaluation is an assigned initial weight that is adjustable based on information received from the caller;
    for each of the plurality of available time slots, aggregate the plurality of intermediate results using multiplicative weightings based on respective weights associated with the corresponding heuristic evaluations to produce aggregated results;
    generate a ranked list of candidate time slots for the appointment based on the aggregated results; and
    prompt the caller for a selection from the ranked list of candidate time slots.

8. The system of claim 7, wherein the set of heuristic evaluations is based on one or more of date preference, time of day preference, day of week preference, current time, current date, current time of day, and current day of week, and each such heuristic evaluation gives a higher score for a time and/or date closer to the date and time of the caller preferred choice.

9. The system of claim 7, wherein the set of heuristic evaluations is based on one or more of historical preferences, historical selections, popular preferences, popular selections, and each such heuristic evaluation results in a higher score for a time and/or date closer to the historical preferences or historical selections and/or closer to the popular preferences or popular selections.

10. The system of claim 7, wherein the set of heuristic evaluations is based on at least one customer heuristic defined in an evaluable expression for a computable quantity or retrievable data using a general-purpose programming language.

11. The system of claim 7, wherein the one or more processors are further configured to adjust a value of the assigned initial weight based on the information received from the caller.

12. The system of claim 7, wherein the one or more processors are further configured to adjust a value of the assigned initial weight based on machine learning that includes increasing the value of the assigned initial weight if a selected heuristic evaluation generates a high score for the selection from the ranked list of candidate time slots and decreasing the value of the assigned initial weight if the selected heuristic evaluation fails to predict the selection from the ranked list of candidate time slots.

13. A non-transitory computer readable storage media encoded with software comprising computer executable instructions and when the software is executed operable to:
    receive a call from a caller at an interactive voice response server;

receive from the caller information indicating a caller preferred choice for an appointment, the caller preferred choice including a date and a time for the appointment;

determine that the caller preferred choice for the appointment is not available;

evaluate, using a set of heuristic evaluations, each of a plurality of available time slots individually to generate a plurality of intermediate results for each of the plurality of available time slots to be used for the appointment, each intermediate result having a weight associated with a corresponding heuristic evaluation, wherein at least one of the weights associated with a corresponding heuristic evaluation is an assigned initial weight that is adjustable based on information received from the caller;

for each of the plurality of available time slots, aggregate the plurality of intermediate results using multiplicative weightings based on respective weights associated with the corresponding heuristic evaluations to produce aggregated results;

generate a ranked list of candidate time slots to be used for the appointment based on the aggregated results; and prompt the caller for a selection from the ranked list of candidate time slots.

14. The non-transitory computer readable storage media of claim 13, wherein the set of heuristic evaluations is based on one or more of date preference, time of day preference, day of week preference, current time, current date, current time of day, and current day of week, and each such heuristic evaluation results in a higher score for a time and/or date closer to the date and time of the caller preferred choice.

15. The non-transitory computer readable storage media of claim 13, wherein the set of heuristic evaluations is based on one or more of historical preferences, historical selections, popular preferences, popular selections, and each such heuristic evaluation results in a higher score for a time and/or date closer to the historical preferences or historical selections and/or closer to the popular preferences or popular selections.

16. The non-transitory computer readable storage media of claim 13, wherein the set of heuristic evaluations is based on at least one customer heuristic defined in an evaluable expression for a computable quantity or retrievable data using a general-purpose programming language.

17. The non-transitory computer readable storage media of claim 13, further operable to adjust a value of the assigned initial weight based on the information received from the caller and/or based on machine learning that includes increasing the value of the assigned initial weight if a selected heuristic evaluation generates a high score for the selection from the ranked list of candidate time slots and decreasing the value of the assigned initial weight if the selected heuristic evaluation fails to predict the selection from the ranked list of candidate time slots.

\* \* \* \* \*